(12) United States Patent
Hoering et al.

(10) Patent No.: US 8,549,948 B2
(45) Date of Patent: Oct. 8, 2013

(54) ARRANGEMENT OF A GEAR SHIFT FORK IN A TRANSMISSION

(75) Inventors: Gerhard Hoering, Hagnau (DE); Martin Miller, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 528 days.

(21) Appl. No.: 12/529,638

(22) PCT Filed: Mar. 7, 2008

(86) PCT No.: PCT/EP2008/052743
§ 371 (c)(1),
(2), (4) Date: Sep. 2, 2009

(87) PCT Pub. No.: WO2008/116736
PCT Pub. Date: Oct. 2, 2008

(65) Prior Publication Data
US 2010/0116076 A1    May 13, 2010

(30) Foreign Application Priority Data
Mar. 23, 2007  (DE) .......................... 10 2007 013 929

(51) Int. Cl.
*B60K 20/00* (2006.01)
*F16H 63/32* (2006.01)

(52) U.S. Cl.
USPC ..................................................... 74/473.37

(58) Field of Classification Search
USPC ................ 74/473.25, 473.36, 473.37, 473.24
See application file for complete search history.

(56) References Cited

U.S. PATENT DOCUMENTS

| | | | |
|---|---|---|---|
| 2,685,210 A | | 8/1954 | Heisler |
| 3,242,759 A | * | 3/1966 | Magg et al. ................. 74/473.25 |
| 3,731,554 A | | 5/1973 | Renk |
| 4,222,281 A | | 9/1980 | Mylenek |
| 4,273,004 A | * | 6/1981 | Morrison et al. .......... 74/473.24 |
| 4,716,779 A | * | 1/1988 | Heinzelmann ................ 74/473.1 |
| 4,867,717 A | * | 9/1989 | Burmeister et al. ............ 440/86 |
| 5,463,911 A | | 11/1995 | Knoedel et al. |
| 5,743,147 A | * | 4/1998 | Gazyakan ................... 74/473.25 |
| 6,234,038 B1 | * | 5/2001 | Loeffler ..................... 74/473.37 |
| 6,374,690 B1 | * | 4/2002 | Koyama et al. .............. 74/473.1 |
| 6,854,353 B2 | * | 2/2005 | Koerber ..................... 74/473.11 |
| 7,216,560 B2 | | 5/2007 | Fuhrer |
| 2002/0139222 A1 | | 10/2002 | Blanchard |
| 2006/0011008 A1 | * | 1/2006 | Hara et al. ................. 74/473.36 |
| 2008/0060461 A1 | | 3/2008 | Hohn |

FOREIGN PATENT DOCUMENTS

| | | |
|---|---|---|
| CH | 621 975 | 3/1981 |
| DE | 1 405 913 | 12/1968 |
| DE | 2 062 691 | 7/1972 |

(Continued)

*Primary Examiner* — Alan Waits
(74) *Attorney, Agent, or Firm* — Davis & Bujold, PLLC; Michael J. Bujold

(57) ABSTRACT

An arrangement of a shift rocker (1), in a transmission housing, comprising a sliding sleeve (2) and a shift rod (3). The shift rocker (1) is mounted to pivot relative to the housing about a pivot axis, can be actuated by the shift rod (3), and engages with an annular groove of the sliding sleeve (2), via sliding blocks (6, 7). The pivot axis of the shift rocker is substantially vertically orientated and the shift rocker (1) has at least one supporting element (9), located outside the vertically orientated pivot axis, which rests on the shift rod (3).

12 Claims, 2 Drawing Sheets

(56) References Cited

FOREIGN PATENT DOCUMENTS

| | | |
|---|---|---|
| DE | 33 33 423 A1 | 5/1984 |
| DE | 37 35 090 A1 | 4/1989 |
| DE | 43 22 586 A1 | 1/1995 |
| DE | 43 42 957 A1 | 6/1995 |
| DE | 199 54 545 C1 | 3/2001 |
| DE | 101 60 859 A1 | 6/2003 |
| DE | 102 30 184 A1 | 1/2004 |
| DE | 10 2004 008 185 A1 | 9/2005 |
| DE | 10 2005 005 693 A1 | 8/2006 |
| EP | 0 004 361 A2 | 10/1979 |

* cited by examiner

ARRANGEMENT OF A GEAR SHIFT FORK IN A TRANSMISSION

This application is a National Stage completion of PCT/EP2008/052743 filed Mar. 7, 2008, which claims priority from German patent application serial no. 10 2007 013 929.4 filed Mar. 23, 2007.

FIELD OF THE INVENTION

The invention concerns an arrangement of a shift rocker in a transmission housing.

BACKGROUND OF THE INVENTION

Shift rockers are known shift elements for carrying out gearshifts in a manual transmission. The shift rocker is curved or fork-shaped and is mounted to pivot relative to the transmission housing. It engages with sliding blocks in an annular groove of a shifting or sliding sleeve, which shifts the desired gear. The shift rocker is actuated by a shift rail or shift rod arranged to move longitudinally in the transmission housing and connected to the shift rocker by a coupling joint. This causes the shift rocker to pivot in one direction or the other.

From DE 43 42 957 A1 by the present applicant a shifting mechanism with a shift rocker of this type has become known. The pivoting mounting of the shift rocker is effected by means of two pins fixed on the housing, which engage in corresponding blind-hole bores in the shift rocker and thus on the one hand enable a pivoting movement about a pivot axis defined by the pins, and on the other hand allow some axial play so that the sliding blocks can slide within the annular groove of the sliding sleeve without catching. In this known shifting mechanism the shift rocker's pivot axis defined by the pins is arranged horizontally.

Problems can arise if the pivot axis is arranged not horizontally but vertically—because in relation to the engagement of the sliding blocks in the annular groove of the sliding sleeve various situations can exist. The shift rocker then rests with its full weight, via the upper sliding block, on the bottom of the annular grove in the sliding sleeve, whereas there is some play between the lower sliding block and the annular groove. This has the disadvantage that the upper sliding block is continually subjected to wear and the lower sliding block slips out of the annular groove (downward), so that the overlap is no longer optimal. In the prior art the engagement of the shift rocker in the shift rod is so designed that a corresponding projection or finger of the shift rocker engages, from below, in a groove of the shift rod, so that no gravitational force is transmitted from the shift rocker to the shift rod. Accordingly, as the upper sliding block becomes progressively more worn the play in the vertical direction between the shift rocker and the shift rod also increases, which reduces the overlap and results in increased loading of the shift rod and the shift rocker.

SUMMARY OF THE INVENTION

The purpose of the present invention is to design an arrangement of a shift rocker of the type described at the start, in such manner that wear of the sliding blocks is reduced and engagement of the sliding blocks in the sliding sleeve and the engagement of the shift rocker in the shift rod are improved.

According to the invention it is provided that the shift rocker rests its weight on the shift rod and no longer—as in the prior art—on the sliding sleeve. By virtue of its pivot bearing on pivot pins the shift rocker can move freely in the vertical direction, so that the weight of the shift rocker can be supported on the shift rod by a supporting element arranged on the shift rocker. This has the advantage that the upper sliding block is relieved from the weight of the shift rocker, so that the friction force between the upper sliding block and the base of the groove in the sliding sleeve is reduced. This improves the efficiency of the transmission. The upper sliding block rests on the groove bottom of the sliding sleeve only under its own weight. Moreover, another advantage is that the supporting element rests at all times against the shift rod on a corresponding contact surface, so that optimum engagement is achieved during transfer of the shifting movement from the shift rod to the shift rocker. In addition, the overlap between the lower sliding block and the annular groove of the sliding sleeve is improved.

In a preferred design, the shift rod has a groove opening downward, in which a coupling element of the shift rocker engages. The supporting element also arranged on the shift rocker, rests on a contact surface against the upper circumference of the shift rod, and so supports the shift rocker on the shift rod. This division of functions has the advantage that the shifting force transmission takes place with less friction.

BRIEF DESCRIPTION OF THE DRAWINGS

An example embodiment of the invention is illustrated in the drawings and will be described in more detail below. The drawings show.

DETAILED DESCRIPTION OF THE PREFERRED EMBODIMENTS

Figure 1:
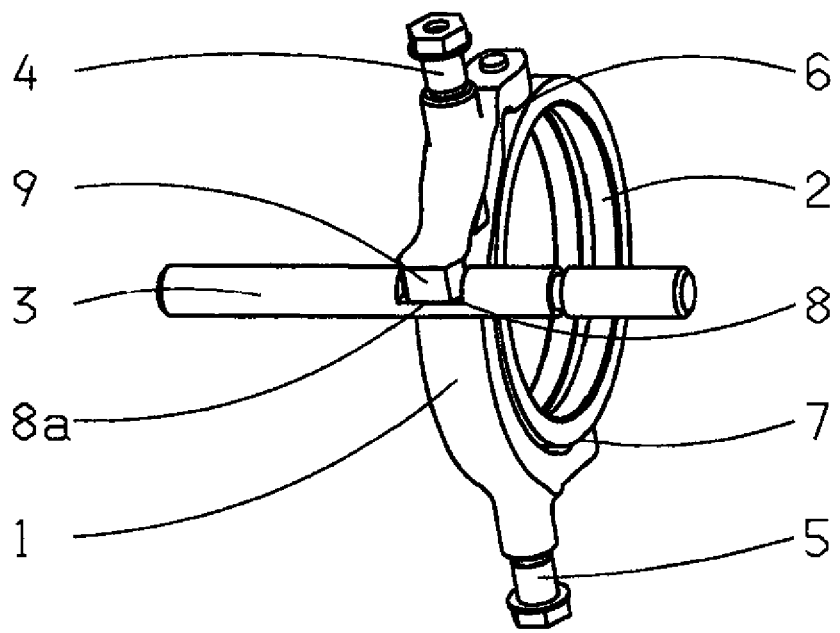
FIG. 1: Perspective representation of a shift rocker according to the invention, with its sliding sleeve and shift rod.
Figure 3:
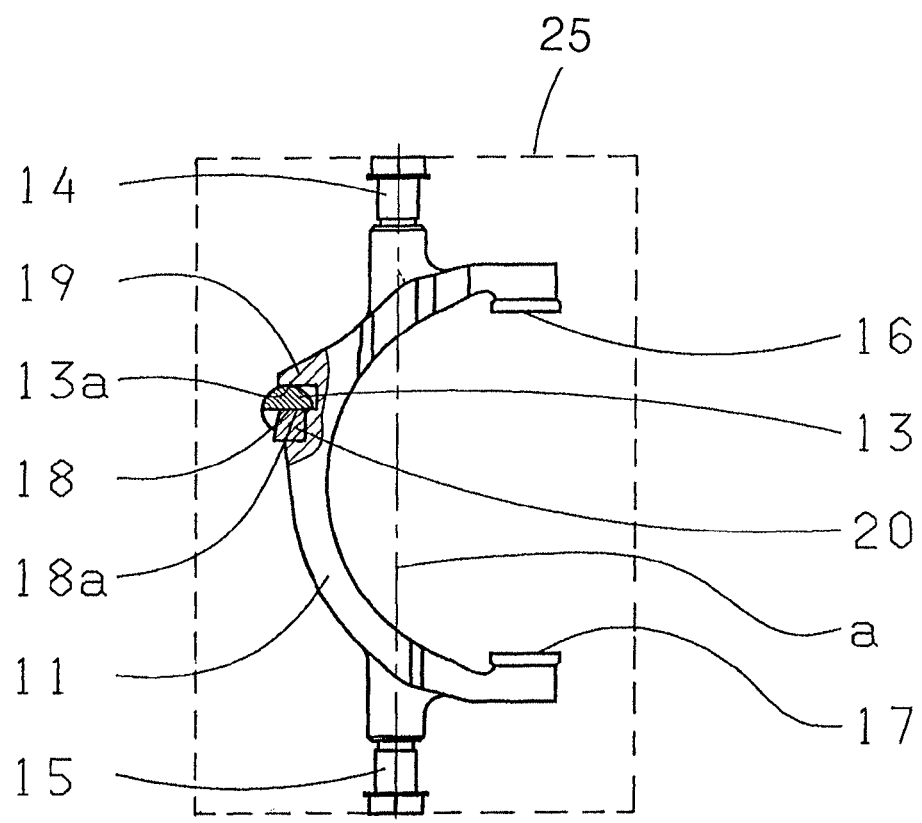
FIG. 3: Another example embodiment of the invention, with a shift rocker and shift rod.

FIG. 1 shows a perspective representation of a shift rocker 1, a sliding sleeve 2 and a shift rod 3, arranged in a housing 25 of a manual transmission (see FIG. 3). The shifting means 1, 2, 3 shown serve to carry out gearshifts, during which the sliding sleeve is pushed axially over a shaft (not shown) to engage in an adjacent gearwheel (not shown). The shift rocker 1 is mounted to pivot on two pins 4, 5 fixed on the housing, the pivot axis defined by the longitudinal axes of the said pins being orientated vertically. The shift rocker 1 engages with two sliding blocks, an upper sliding block 6 and a lower sliding block 7, in an annular groove (not indexed) of the sliding sleeve 2. The shift rod 3 is mounted fixed on the housing—this is not shown—and in the area of the shift rocker 1 has a groove 8 open upward, in which a supporting element 9 arranged on the shift rocker 1 engages. Together with the shift rod 3 the supporting element 9 forms a coupling joint so that when the shift rod 3 moves axially, the shift rocker 1 undergoes a rotation or pivoting movement about the pins 4, 5. On the other hand, the shift rocker 1 rests with its weight, via the supporting element 9, on the shift rod 3—with the supporting element 9 resting against the groove bottom (contact surface) 8a of the groove 8.

Figure 2:
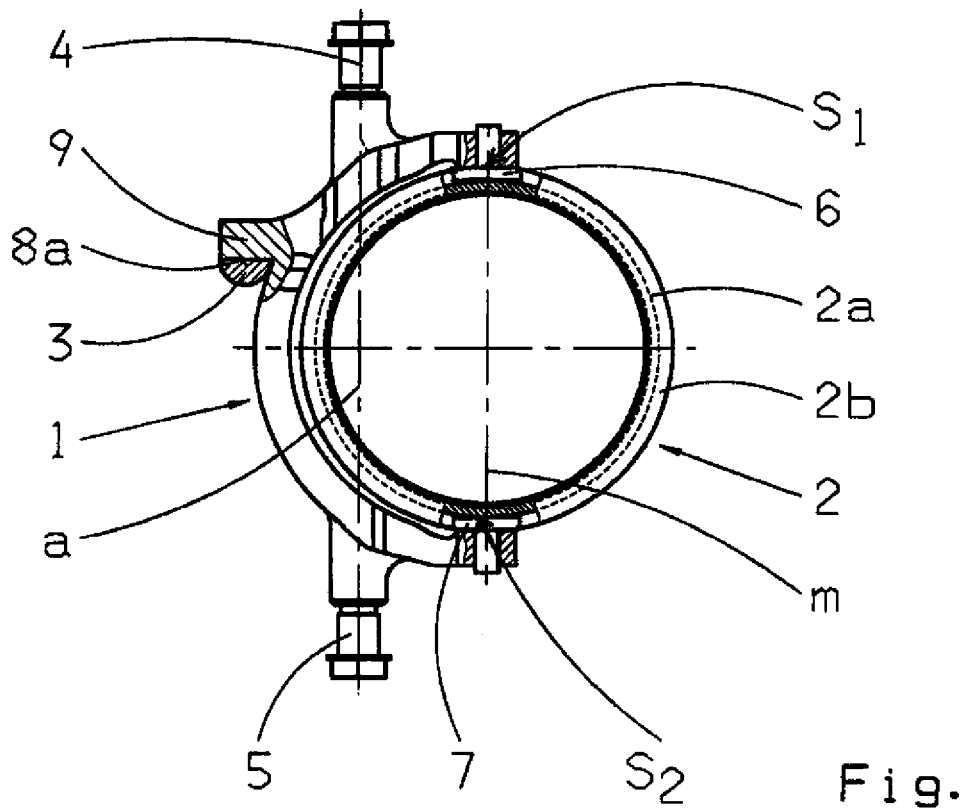
FIG. 2: View of the shift rocker with its sliding sleeve and shift rod in the axial direction.

FIG. 2 shows the arrangement in FIG. 1 viewed in the axial direction, showing the sliding sleeve 2, the shift rocker 1 and the shift rod 3, which is also called the shift rail. In this representation the pivot axis defined by the upper pin 4 and the lower pin 5 is arranged vertically and indexed a. The shift rocker 1 can move upward and downward in the direction of the pivot axis a, i.e. the pins 4, 5, which engage in blind-hole bores of the shift rocker 1 in a manner not shown, are formed as axial loose bearings. The sliding blocks 6, 7 are guided in the shift rocker 1 by sliding pins (not shown) and can move in the pin direction, i.e. in the direction of the vertical diameter m. In the area of the groove 8 the shift rod 3 forms the upward-facing contact surface 8a, against which the supporting element 9 of the shift rocker 1 rests. Thus—disregarding friction forces at the bearing points of the pins and sliding blocks—the weight of the shift rocker 1 is supported completely on the shift rod 3. Consequently, the shift rocker 1 no longer presses, via the upper sliding block 6 against the sliding sleeve 2, but rather, the upper sliding block 6 rests only under its own weight against the groove bottom 2a of the annular groove 2b. Between the upper side of the upper sliding block 6 and the lower side of the shift rocker there is some play $s_1$. Analogously, between the upper side of the lower sliding block 7 and the groove bottom 2a there is some play $s_2$. By virtue of the support, according to the invention, of the shift rocker 1 on the shift rod 3 there is a constant overlap of the sliding blocks 6, 7 relative to the annular groove 2b and, on the other hand, constant contact between the supporting element 9 and the contact surface 8a, so that there too there is an optimum overlap.

FIG. 3 shows a further example embodiment of the invention, the same components as in FIGS. 1 and 2 being indexed in FIG. 3 with a number increased by 10. Thus, FIG. 3 shows a shift rocker 11 mounted to pivot about a vertically orientated pivot axis a on pins 14, 15 fixed to the housing. Analogously to the previous example embodiment, an upper sliding block 16 and a lower sliding block 17 are fitted in the shift rocker 11. A shift rod 13 is shown in cross-section and has a groove 18 open downward, with a downward-facing groove bottom 18a. In contrast to the example embodiment of FIGS. 1 and 2, where the groove 8 is open upward, the groove 18 is open downward. A supporting element 19 formed as a projection extending from the shift rocker 11 rests on the upper edge 13a (contact surface) of the shift rod 13 and so supports the shift rocker 11 with its weight on the shift rod 13. The shift rocker 11 also has a coupling element 20 formed as a finger, which engages in the groove 18 of the shift rod 13. The coupling element 20 can for example also be made integrally with the shift rocker 11. The coupling element 20 does not transmit any gravitational forces to the shift rod 13, so there are no weight-related friction forces as there are in the previous example embodiment. The supporting element 19 and the coupling element 20 are approximately U-shaped and surround the shift rod 13 in the area of the groove 18. Thus, in this example embodiment there is a division of functions in the sense that the weight of the shift rocker 11 is transferred via the projecting supporting element 19 onto the shift rod 13 and the shifting movement of the shift rod 13 is transmitted by the coupling element 20 to the shift rocker 11. As a result, minimal friction losses occur during a shift process so that the shifting comfort is increased.

INDEXES

1. Shift rocker
2. Sliding sleeve
3. Shift rod
4. Pin
5. Pin
6. Sliding block
7. Sliding block
8. Groove
8a. Groove bottom
9. Supporting element
11. Shift rocker
12. Sliding sleeve
13. Shift rod
13a. Contact surface
14. Pin
15. Pin
16. Sliding block
17. Sliding block
18. Groove
18a. Groove bottom
19. Supporting element
20. Coupling element

The invention claimed is:

1. An arrangement of a shift rocker (1, 11), in a transmission housing, comprising a sliding sleeve (2) and a shift rod (3, 13), the shift rod being cylindrical and having a rod groove which defines a chord in a cross section of the shift rod,
    the shift rocker (1, 11) being mounted to pivot relative to the transmission housing about a pivot axis (a), the shift rocker (1, 11) being actuatable by the shift rod (3, 13) and engaging, via sliding blocks (6, 7; 16, 17), in an annular groove (2b) of the sliding sleeve (2),
    the pivot axis (a) of the shift rocker (1, 11) being vertical, and
    the shift rocker (1, 11) having at least one supporting element (9, 19) spaced from the vertical pivot axis (a),
    either the at least one supporting element (9, 19) being received within the rod groove (8) or a coupling element (20) vertically aligned with the supporting element (9, 19) being received within the rod groove (8), and
    the at least one supporting element (9, 19) directly abuts the shift rod (3) to vertically support the shift rocker (1, 11) on the shift rod (3), and the at least one supporting element (9, 19) being the only vertically directed support for the shift rocker (1, 11).

2. The arrangement of the shift rocker (1, 11) according to claim 1, wherein the shift rocker (1, 11) is mounted, radially relative to the pivot axis (a), by pins (4, 5; 14, 15) fixed to the transmission housing.

3. The arrangement of the shift rocker (1, 11) according to claim 1, wherein the sliding blocks (6, 7; 16, 17) are slidably supported in the shift rocker (1, 11).

4. The arrangement of the shift rocker (1, 11) according to claim 1, wherein the rod groove (8) of the shift rod (3) has a groove bottom surface (8a) which defines the chord in the cross section of the shift rod, the rod groove (8) in the shift rod (3) opens vertically upwardly, with respect to the pivot axis (a), and the supporting element (9) engages with the rod groove (8) and is supported by the groove bottom (8a), the supporting element being integral with the shift rocker such that the supporting element and the shift rocker are immovable with respect to each other.

5. The arrangement of the shift rocker (1, 11) according to claim 1, wherein the supporting element is a projection (9) extending from the shift rocker (1), the projection having a face which abuts the chord and projects across a full length of the chord.

6. The arrangement of the shift rocker (1, 11) according to claim 1, wherein the rod groove (18) of the shift rod (13) opens vertically downwardly, with respect to the pivot axis (a), and the supporting element (19) rests on an upper side (13a) of the shift rod (13).

7. The arrangement of the shift rocker (1, 11) according to claim 6, wherein the coupling element (20) of the shift rocker (11) engages with the rod groove (18).

8. The arrangement of the shift rocker (1, 11) according to claim 1, wherein the sliding blocks (6, 7; 16, 17) comprise an upper sliding block (6, 16) and a lower sliding block (7, 17) and are freely movable in a vertical direction (m) such that the upper sliding block (6;16) is movable relative to the shift rocker (1, 11) in the vertical direction and the lower sliding block (7, 17) is movable relative to a bottom of the annular groove (2*a*) in the vertical direction.

9. The arrangement of the shift rocker (1, 11) according to claim 1, wherein the sliding blocks (6, 7; 16, 17) comprise an upper sliding block (6, 16) and a lower sliding block (7, 17) and both the supporting element (9, 19) and the shift rod (3) are located vertically between the upper sliding block (6, 16) and the lower sliding block (7, 17).

10. The arrangement of the shift rocker (1, 11) according to claim 1, wherein the sliding blocks (6, 7; 16, 17) comprise an upper sliding block (6, 16) and a lower sliding block (7, 17), the supporting element (9, 19) extends horizontally from the shift rocker (1, 11) and is located vertically above and received within the rod groove (8) of the shift rod (3), and both the supporting element (9, 19) and the shift rod (3) are located vertically between the upper sliding block (6, 16) and the lower sliding block (7, 17).

11. An arrangement of a shift rocker (1, 11), in a transmission housing, comprising a sliding sleeve (2) and a shift rod (3, 13), the shift rod being cylindrical and having a rod groove which defines a chord in a cross section of the shift rod;
    the shift rocker (1, 11) being mounted to pivot relative to the transmission housing about a pivot axis (a), the shift rocker (1, 11) being actuatable by the shift rod (3, 13) and engaging, via sliding blocks (6, 7; 16, 17), in an annular groove (2*b*) of the sliding sleeve (2);
    the pivot axis (a) being substantially vertical;
    the shift rocker (1, 11) having at least one supporting element (9, 19) that is arranged outside the pivot axis (a) and that directly abuts the shift rod (3) to vertically support the shift rocker (1, 11);
    the rod groove (18) opens vertically downwardly, with respect to the pivot axis (a), and the supporting element (19) rests on an upper side (13*a*) of the shift rod (13) and a coupling element is received within the rod groove (18); and
    the supporting element (19) and the coupling element (20) form a U-shape and support the shift rod (13) therein.

12. An arrangement of a shift rocker (1, 11) in a transmission housing, the arrangement comprising:
    opposed first and second pins (4, 5) being fixed with respect to the transmission housing, each of the first and second pins (4, 5) communicating with a respective blind bore in the shift rocker (1), the blind bores in the shift rocker (1) being coaxially aligned along a vertical axis (a) such that the first and the second pins (4, 5) are coaxial with the vertical axis (a), the first pin (4) being located vertically above the second pin (5), the first and the second pins (4, 5) facilitate pivoting of the shift rocker (1) about the vertical axis (a);
    a horizontally aligned shift rod (3) having a cylindrical exterior surface, and the exterior surface of the shift rod having a rod groove (8) with a bottom groove surface (8*a*), the rod groove (8) being located in a vertically upper portion of the shift rod (3) such that the bottom groove surface (8*a*) vertically faces upward, and the bottom groove surface (8*a*) defining a chord of a circular cross section of the shift rod;
    a supporting element (9) extending horizontally from the shift rocker (1) and being vertically above and received within the rod groove (8) of the shift rod (3), the supporting element (9) having a vertically downward facing surface that directly abuts the bottom groove surface (8*a*) such that a weight of the supporting element (9) and the shift rocker (1) is supported by the bottom groove surface (8*a*) of the rod groove (8), and the supporting element extending across an entire length of the chord of the circular cross section of the shift rod; and
    upper and lower sliding blocks (6, 7) being coaxially and vertically aligned in the shift rocker (1) and each communicating with an annular groove (2*a*, 2*b*) of a sliding sleeve (2), the upper and the lower sliding blocks (6, 7) are coaxial with a vertical diameter (m) of the sliding sleeve (2), the upper sliding block (6) being located vertically above the lower sliding block (7), the upper sliding block (6) being movable with respect to the shift rocker (1) along the vertical diameter (m) and the lower sliding block is movable relative to a bottom surface of the annular groove along the vertical diameter (m).

\* \* \* \* \*